United States Patent
Dai et al.

(10) Patent No.: US 8,345,661 B2
(45) Date of Patent: Jan. 1, 2013

(54) METHOD FOR SENDING PHYSICAL HYBRID ARQ INDICATOR CHANNEL SIGNALS IN A DOWNLINK PILOT TIME SLOT

(75) Inventors: Bo Dai, Shenzhen (CN); Shuqiang Xia, Shenzhen (CN); Peng Hao, Shenzhen (CN); Chunli Liang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 340 days.

(21) Appl. No.: 12/809,177

(22) PCT Filed: Nov. 21, 2008

(86) PCT No.: PCT/CN2008/073146
§ 371 (c)(1),
(2), (4) Date: Jun. 18, 2010

(87) PCT Pub. No.: WO2009/097724
PCT Pub. Date: Aug. 13, 2009

(65) Prior Publication Data
US 2010/0309826 A1    Dec. 9, 2010

(30) Foreign Application Priority Data
Jan. 30, 2008    (CN) .......................... 2008 1 0004775

(51) Int. Cl.
*H04J 3/06* (2006.01)
(52) U.S. Cl. ...................................................... 370/350
(58) Field of Classification Search ........................ None
See application file for complete search history.

(56) References Cited

U.S. PATENT DOCUMENTS

| | | | |
|---|---|---|---|
| 6,317,418 | B1 | 11/2001 | Raitola et al. |
| 6,697,987 | B2 | 2/2004 | Lee et al. |
| 2008/0187136 | A1 | 8/2008 | Zhang |
| 2008/0298387 | A1 | 12/2008 | Lohr et al. |
| 2011/0195719 | A1* | 8/2011 | Chmiel et al. ................ 455/450 |

FOREIGN PATENT DOCUMENTS

| | | |
|---|---|---|
| CN | 1674489 A | 9/2005 |
| CN | 101053194 A | 10/2007 |
| CN | 101084695 A | 12/2007 |
| CN | 101227260 A | 7/2008 |
| RU | 2258314 C2 | 8/2005 |
| WO | 03055122 A1 | 7/2003 |

(Continued)

OTHER PUBLICATIONS

International Search Report in international application No. PCT/CN2008/073146, mailed Feb. 19, 2009.

(Continued)

*Primary Examiner* — Raj Jain
(74) *Attorney, Agent, or Firm* — Neifeld IP Law, PC (57) ABSTRACT

A method for sending physical hybrid ARQ indicator channel signals in a downlink pilot time slot, characterized in: the Orthogonal Frequency Division Multiplexing (OFDM) symbols of the PHICH signals sent in the DwPTS by a base station differs from the OFDM symbols used for sending the P-SCH signals or the S-SCH signals. According to the method, not only the problem of the confliction between the PHICH signals and the synchronization channel signals in the DwPTS is solved, but also the time delay for sending the PHICH signals is reduced as much as possible, thus an influence on other channels is reduced, and processing of other channels is facilitated.

9 Claims, 7 Drawing Sheets

FOREIGN PATENT DOCUMENTS

WO 2006047851 A1 5/2006

OTHER PUBLICATIONS

English Translation of the Written Opinion of the International Search Authority in international application No. PCT/CN2008/073146, mailed Feb. 19, 2009.
Supplementary European Search Report in European application No. 08872175.8, mailed on Dec. 6, 2011.
Usage of DwPTs Jan. 18, 2008.
CP length of P-SCH for LTE Type 2 Jan. 18, 2008.
RS, Control, and Data in DwPTS Feb. 15, 2008.
Usage of resources in special subframe for FS2 Jan. 8, 2008.
3rd Generation Partnership Project; Technical Specification Group Radio Access Network; Evolved Universal Terrestrial Radio Access (E-UTRA); Physical Channels and Modulation (Release 8) Nov. 1, 2007.
Way Forward on LTE TDD Frame Structure Nov. 6, 2007.

* cited by examiner

METHOD FOR SENDING PHYSICAL HYBRID ARQ INDICATOR CHANNEL SIGNALS IN A DOWNLINK PILOT TIME SLOT

TECHNICAL FIELD

The present invention relates to a method for sending signals over a physical channel in a communication system, and especially to a method for sending physical hybrid ARQ indicator channel signals in a downlink pilot time slot over the physical channel.

BACKGROUND

Figure 1:
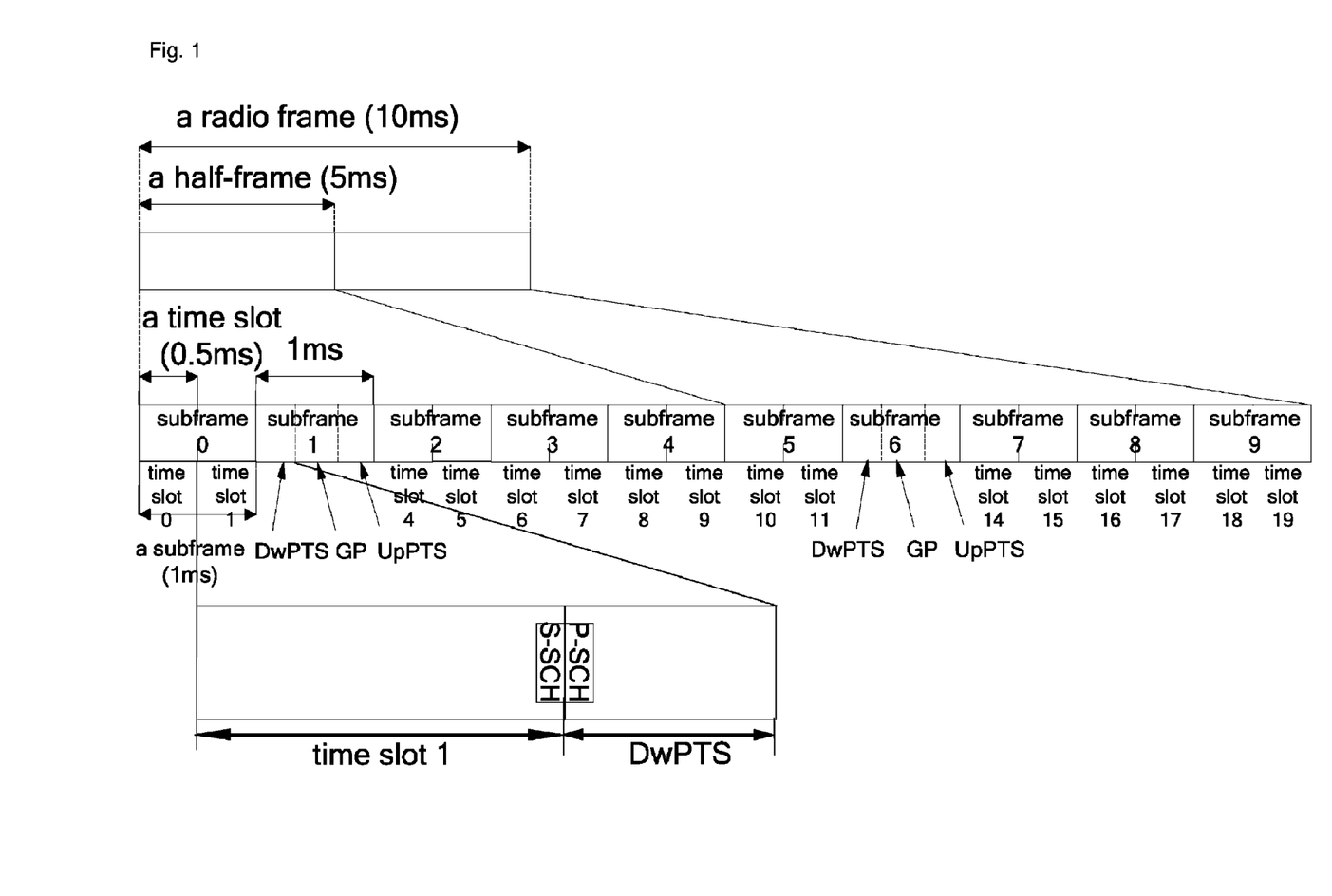
FIG. 1 is a schematic diagram illustrating a TDD frame structure in an LTE system.

A TDD (time division duplex) frame structure in a long term evolution (LTE) system is as shown in FIG. 1. In such a frame structure, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). For a normal cyclic prefix (CP) of a length of 5.21 µs or 4.69 µs, a time slot contains 7 uplink/downlink symbols equally of a length of 66.7 µs (7×66.7 µs), wherein the length of the CP of the first symbol is 5.21 µs, and that of each of the remaining 6 symbols is 4.69 µs. For an extended CP of a length of 16.67 µs, a time slot contains 6 uplink/downlink symbols. Additionally, in such a frame structure, the configuration characteristics of the subframe are as follows:

(1) subframe 0 and subframe 5 are always reserved for downlink transmission;

(2) the downlink-to-uplink switch-point with a periodicity of 5 ms or 10 ms is supported;

(3) subframe 1 and subframe 6 are special subframes, which are used for transmitting 3 special time slots that are a downlink pilot time slot (DwPTS), a guard period (GP) and an uplink pilot time slot (UpPTS), wherein the DwPTS is used for downlink transmission;

the GP refers to protection time, in which no data is transmitted; and the UpPTS is used for uplink transmission, and contains at least 2 uplink SC-FDMA symbols for transmitting physical random access channels (PRACHs);

(4) in case of the downlink-to-uplink switch-point with a periodicity of 5 ms, subframe 2 and subframe 7 are always reserved for uplink transmission;

(5) in case of the downlink-to-uplink switch-point with a periodicity of 10 ms, the DwPTS is present in two half-frames, the GP and the UpPTS are present in the first half-frame, the time length of the DwPTS in the second half-frame is 1 ms, subframe 2 is used for uplink transmission, and subframe 7-9 are used for downlink transmission;

(6) primary-synchronization channel (P-SCH) signals are sent in the first Orthogonal Frequency Division Multiplexing (OFDM) symbol included in the DwPTS; and secondary-synchronization channel (S-SCH) signals are sent in the last OFDM symbols included in the time slot 1 and the time slot 11, and the bandwidth of a frequency-domain is 1.08 MHz; and (7) at present, it is prescribed that at least 3 OFDM symbols are included in the DwPTS.

Physical hybrid ARQ indicator channel (PHICH) signals are sent in the first n OFDM symbols included in every common subframe used for downlink transmission, wherein n is 1 or 3 in unicast channels and is 1 or 2 in multicast channels.

If the PHICH signals are still sent in the DwPTS by the sending method for the common subframe and the primary-synchronization signals remain being sent in the first OFDM symbol included in the DwPTS, a confliction may occur between the physical time-frequency position to which the PHICH signals are mapped and the physical time-frequency position to which the primary-synchronization signals are mapped. Therefore, it is required to propose a technical solution for solving the problem of the confliction between the P-SCH signals and the PHICH signals in the DwPTS.

SUMMARY

The technical problem to be solved in the present invention is to provide a method for sending PHICH signals in a DwPTS, by the method the confliction between the PHICH signals and the synchronization channel signals in the DwPTS can be avoided.

In order to solve the above-mentioned problem, a method for sending PHICH signals in a DwPTS is provided in the present invention, which is characterized in: the Orthogonal Frequency Division Multiplexing (OFDM) symbols of the PHICH signals sent in the DwPTS by a base station differs from the OFDM symbols used for sending the P-SCH signals or the S-SCH signals.

Further, the method may be applied to a long term evolution system which is in time division duplex mode; and in a frame structure of the system, a 10 ms radio frame may be divided into two half-frames; each half-frame may be divided into 10 time slots equally of a length of 0.5 ms; every two time slots may constitute a subframe of a length of 1 ms; a radio frame may contain 10 subframes, which are numbered from 0 to 9; a radio frame may contain 20 time slots, which are numbered from 0 to 19; and the DwPTS may be located in subframe 1 and subframe 6.

Further, the DwPTS may include multiple OFDM symbols; it may be indicated by a signaling that there is 1 or 2 OFDM symbols used for transmitting the PHICH signals in the DwPTS.

Further, the P-SCH signals may be sent in a first OFDM symbol included in the DwPTS;

if there is 1 OFDM symbol used for transmitting the PHICH signals, the PHICH signals may be sent in a second OFDM symbol included in the DwPTS;

if there are 2 OFDM symbols used for transmitting the PHICH signals, the PHICH signals may be sent in the second OFDM symbol and a third OFDM symbol included in the DwPTS.

Further, if there is 1 OFDM symbol used for transmitting the PHICH signals in the DwPTS, the PHICH signals may be sent in the first OFDM symbol included in the DwPTS;

if there are 2 OFDM symbols used for transmitting the PHICH signals, the PHICH signals may be sent in the first OFDM symbol and the second OFDM symbol included in the DwPTS;

the P-SCH signals may be sent in the third OFDM symbol included in the DwPTS, and the S-SCH signals may be sent in the last OFDM symbols included in the time slot 1 and the time slot 11.

Further, the DwPTS may include multiple OFDM symbols; it may be indicated by a signaling that there is 1 or 3 OFDM symbols used for transmitting the PHICH signals in the DwPTS;

the P-SCH signals may be sent in the first OFDM symbol included in the DwPTS;

if there is 1 OFDM symbol used for transmitting the PHICH signals, the PHICH signals may be sent in the second OFDM symbol included in the DwPTS;

if there are 3 OFDM symbols used for transmitting the PHICH signals, the PHICH signals may be sent in the second OFDM symbol, the third symbol and the fourth symbol included in the DwPTS.

Further, if there is 1 OFDM symbols used for transmitting the PHICH signals, the PHICH signals may be sent in the first OFDM symbol included in the DwPTS, the P-SCH signals may be sent in the third OFDM symbol included in the DwPTS, and the S-SCH signals may be sent in the last OFDM symbols included in the time slot 1 and the time slot 11;

if there are 3 OFDM symbols used for transmitting the PHICH signals, the PHICH signals may be sent in the first OFDM symbol, the second OFDM symbol and the third OFDM symbol included in the DwPTS; and the P-SCH signals may be sent in the last OFDM symbols included in the time slot 1 and the time slot 11, and the S-SCH signals may be sent in the penultimate OFDM symbols included in the time slot 1 and the time slot 11.

According to the method for sending the PHICH signals in a DwPTS of the present invention, not only the problem of the confliction between the PHICH signals and the synchronization channel signals in the DwPTS is solved, but also the time delay for sending the PHICH signals is reduced as much as possible, thus an influence on other channels is reduced, and processing of other channels is facilitated.

DETAILED DESCRIPTION

The method for sending PHICH signals in a DwPTS according to the present invention is mainly as follows. The OFDM symbol used for sending the PHICH signals is separated from the OFDM symbols used for sending the P-SCH signals and the S-SCH signals in the DwPTS by a base station, besides, the time delay for sending the PHICH signals is reduced as much as possible, thus the PHICH signals are prevented effectively from conflicting with the P-SCH signals and the S-SCH signals in the DwPTS.

Method 1

It is indicated by a signaling that there is 1 or 2 OFDM symbols used for transmitting the PHICH signals in the DwPTS;

if there is 1 OFDM symbol used for transmitting the PHICH signals, the PHICH signals are sent in the second OFDM symbol included in the DwPTS; and if there are 2 OFDM symbols used for transmitting the PHICH signals, the PHICH signals are sent in the second OFDM symbol and the third OFDM symbol included in the DwPTS.

Method 2

It is indicated by a signaling that there is 1 or 3 OFDM symbols used for transmitting the PHICH signals in the DwPTS;

if there is 1 OFDM symbol used for transmitting the PHICH signals, the PHICH signals are sent in the second OFDM symbol included in the DwPTS; and if there are 3 OFDM symbols used for transmitting the PHICH signals, the PHICH signals are sent in the second OFDM symbol, the third OFDM symbol and the fourth OFDM symbol included in the DwPTS.

Method 3

The position for sending the synchronization channel signals are changed, and it is indicated by a signaling that there is 1 or 2 OFDM symbols used for transmitting the PHICH signals in the DwPTS;

if there is 1 OFDM symbol used for transmitting the PHICH signals, the PHICH signals are sent in the first OFDM symbol included in the DwPTS; and if there are 2 OFDM symbols used for transmitting the PHICH signals, the PHICH signals are sent in the first OFDM symbol and the second OFDM symbol included in the DwPTS; and the P-SCH signals are sent in the third OFDM symbol included in the DwPTS; or alternatively, the P-SCH signals are sent in the last OFDM symbols included in the time slot 1 and the time slot 11, and the S-SCH signals are sent in the third symbols included in the DwPTS;

Method 4

The position for sending the synchronization channel signals are changed and it is indicated by a signaling that there is 1 or 3 OFDM symbols used for transmitting the PHICH signals in the DwPTS;

if there is 1 OFDM symbol used for transmitting the PHICH signals, the PHICH signals are sent in the first OFDM symbol included in the DwPTS; and if there are 3 OFDM symbols used for transmitting the PHICH signals, the PHICH signals are sent in the first OFDM symbol, the second OFDM symbol and the third OFDM symbol included in the DwPTS; and the P-SCH signals are sent in the last OFDM symbols included in the time slot 1 and the time slot 11, and the S-SCH signals are sent in the penultimate OFDM symbols included in the time slot 1 and the time slot 11.

Hereinbelow, the above-mentioned technical solution of the present invention is explained in detail with reference to the embodiments and the accompanying drawings.

Figure 2:
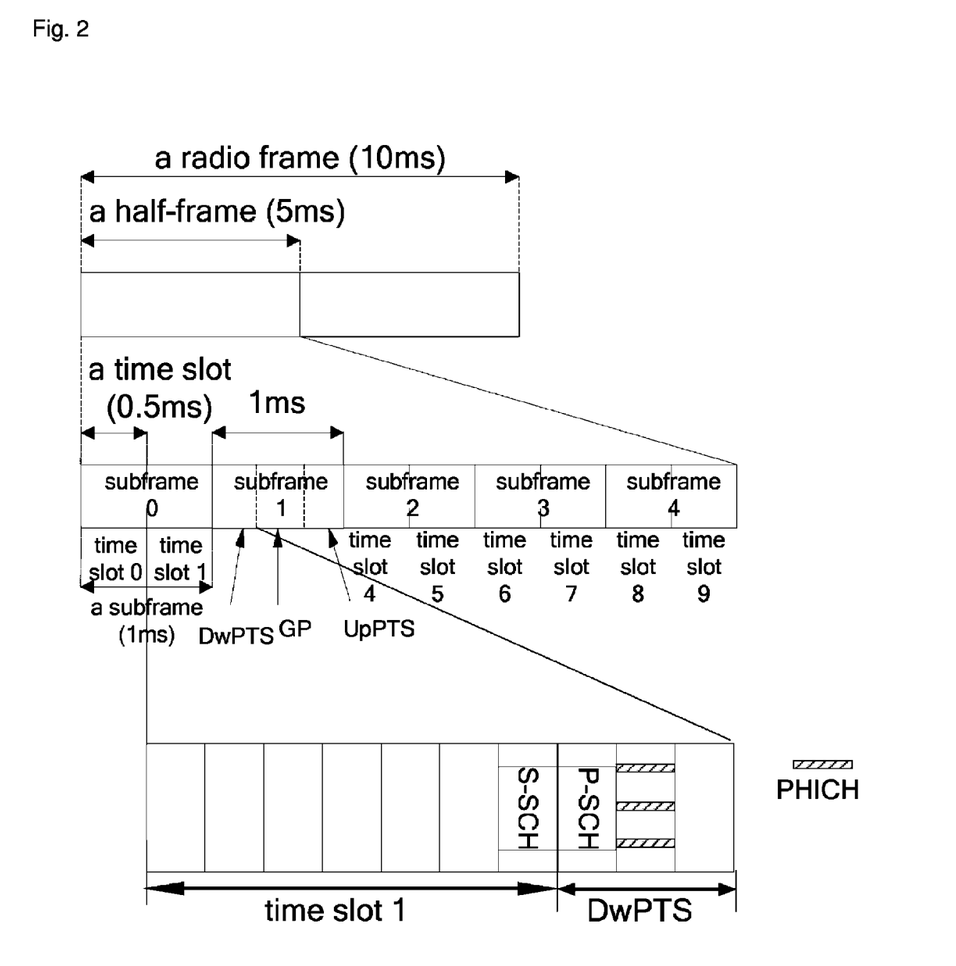
FIG. 2 illustrates an embodiment of sending PHICH signals in a DwPTS according to the present invention.

As shown in FIG. 2, a specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 3 OFDM symbols, the downlink-to-uplink switch-point periodicity is 5 ms, the P-SCH signals are sent in the first OFDM symbol included in the DwPTS, and there is 1 OFDM symbol used for transmitting the PHICH signals, then the PHICH signals are sent in the second OFDM symbol included in the DwPTS.

Figure 3:
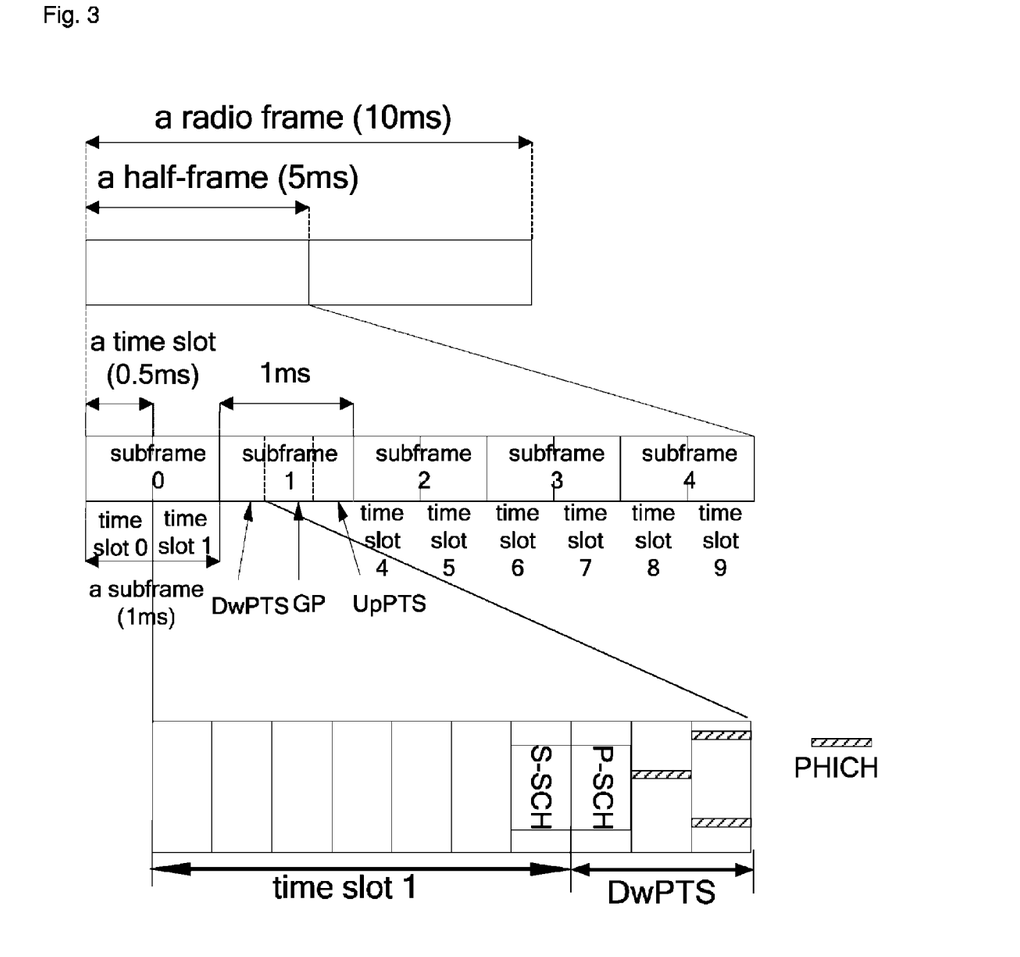
FIG. 3 illustrates another embodiment of sending the PHICH signals in the DwPTS according to the present invention.

As shown in FIG. 3, another specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 3 OFDM symbols, the downlink-to-uplink switch-point periodicity is 5 ms, the P-SCH signals are sent in the first OFDM symbol included in the DwPTS, and there are 2 OFDM symbols used for transmitting the PHICH signals, then the PHICH signals are sent in the second OFDM symbol and the third OFDM symbol included in the DwPTS.

Figure 4:
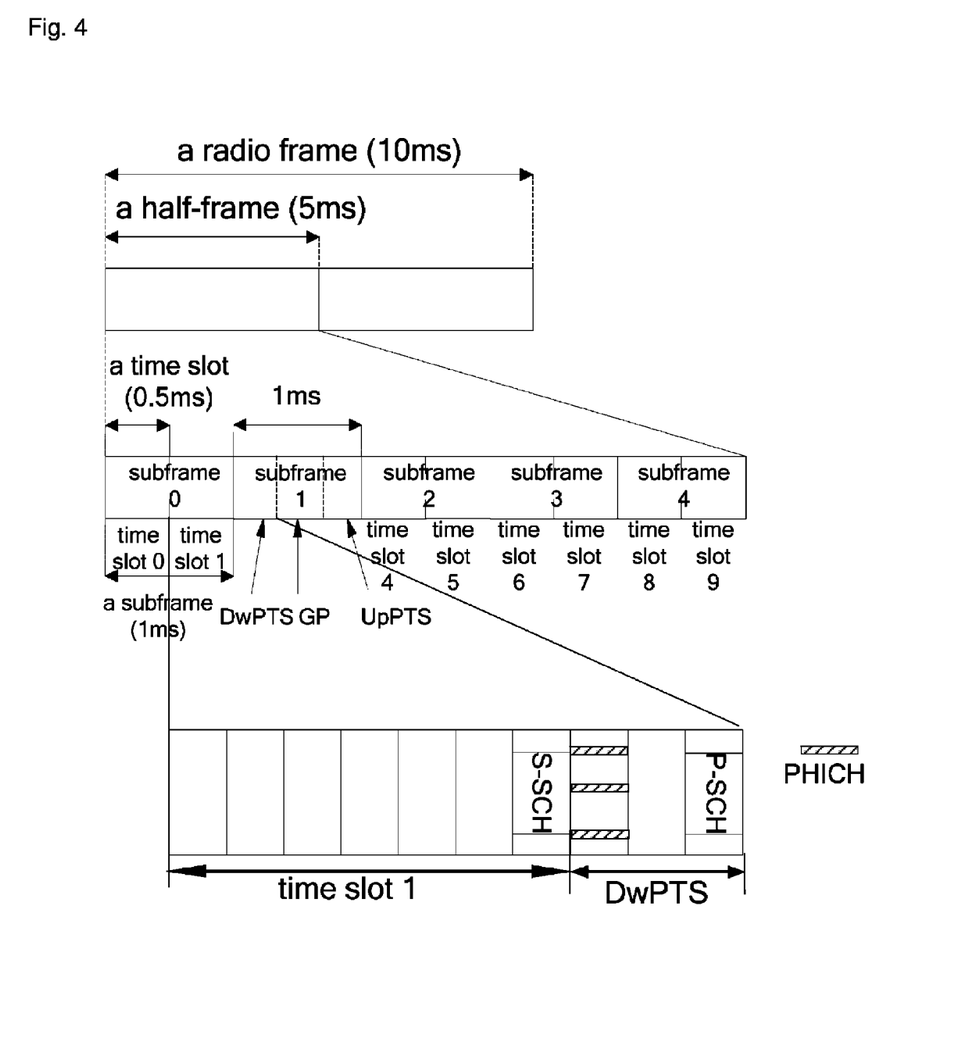
FIG. 4 illustrates still another embodiment of sending the PHICH signals in the DwPTS according to the present invention.

As shown in FIG. 4, still another specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 3 OFDM symbols, the downlink-to-uplink switch-point periodicity is 5 ms, the P-SCH signals are sent in the third OFDM symbol included in the DwPTS, and there is 1 OFDM symbol used for transmitting the PHICH signals, then the PHICH signals are sent in the first OFDM symbol included in the DwPTS.

Figure 5:
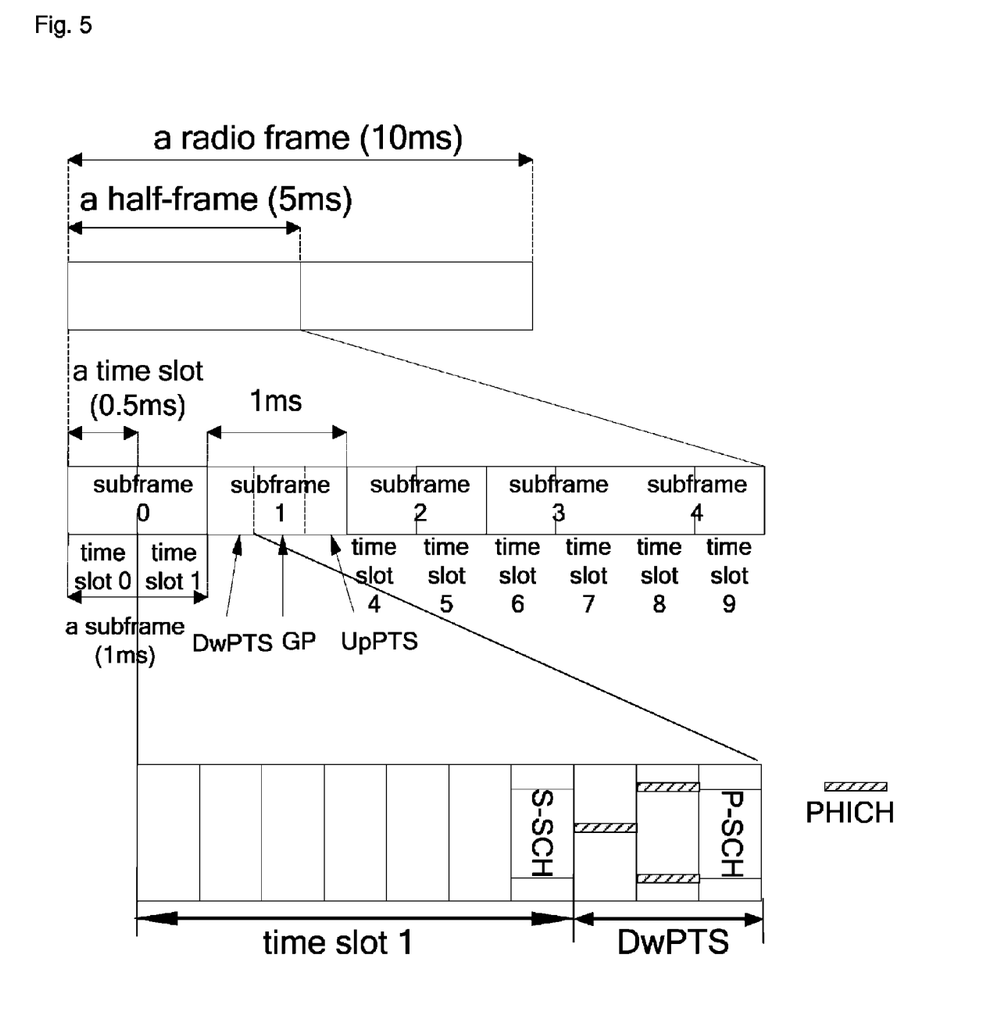
FIG. 5 illustrates still another embodiment of sending the PHICH signals in the DwPTS according to the present invention.

As shown in FIG. 5, still another specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 3 OFDM symbols, the downlink-to-uplink switch-point periodicity is 5 ms, the P-SCH signals are sent in the third OFDM symbol included in the DwPTS, and there are 2 OFDM symbols used for transmitting the PHICH signals, then the PHICH signals are sent in the first OFDM symbol and the second OFDM symbol included in the DwPTS.

Figure 6:
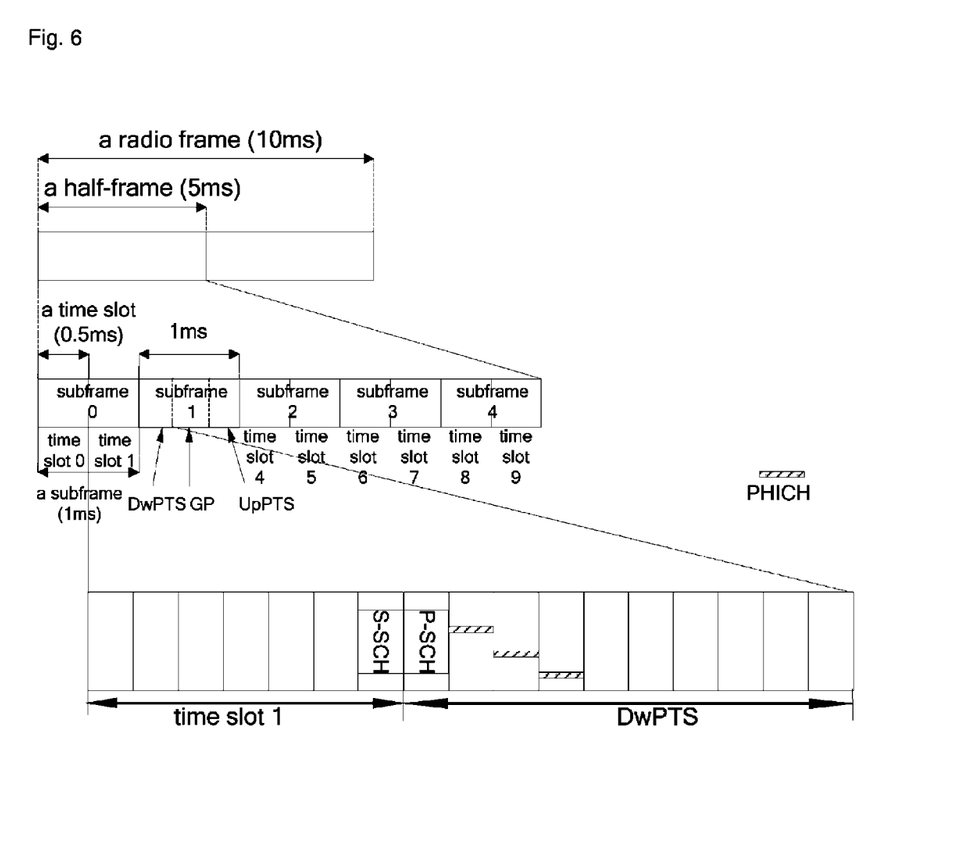
FIG. 6 illustrates still another embodiment of sending the PHICH signals in the DwPTS according to the present invention.

As shown in FIG. 6, still another specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 10 OFDM symbols, the downlink-to-uplink switch-point periodicity is 5 ms, the P-SCH signals are sent in the first OFDM symbol included in the DwPTS, and there are 3 OFDM symbols used for transmitting the PHICH signals, then the PHICH signals are sent in the second OFDM symbol, the third OFDM symbol and the fourth OFDM symbol included in the DwPTS.

Figure 7:
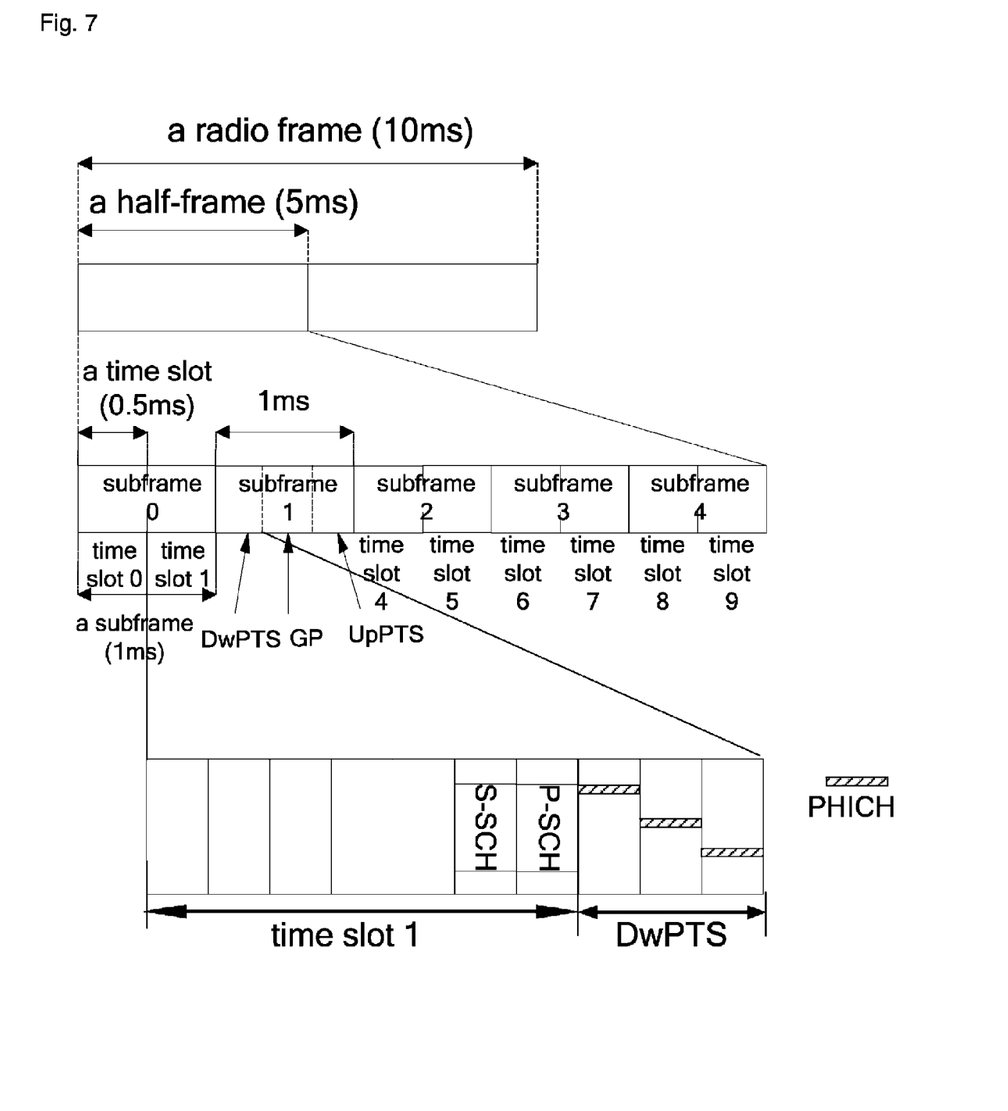
FIG. 7 illustrates still another embodiment of sending the PHICH signals in the DwPTS according to the present invention.

As shown in FIG. 7, still another specific embodiment of sending the PHICH signals in the DwPTS according to the present invention is illustrated. In the LTE system, a 10 ms radio frame is divided into two half-frames; each half-frame is divided into 10 time slots equally of a length of 0.5 ms; every two time slots constitute a subframe of a length of 1 ms; a radio frame contains 10 subframes (numbered from 0 to 9); and a radio frame contains 20 time slots (numbered from 0 to 19). In the normal CP, a subframe contains 14 OFDM symbols. Assume that the DwPTS contains 10 OFDM symbols, the downlink-to-uplink switch-point periodicity is 5 ms, the P-SCH signals are sent in the last OFDM symbols included in the time slot 1 and the time slot 11, the S-SCH signals are sent in the penultimate OFDM symbols included in the time slot 1 and the time slot 11, and there are 3 OFDM symbols used for transmitting the PHICH signals, then the PHICH signals are sent in the first OFDM symbol, the second OFDM symbol and the third OFDM symbol included in the DwPTS.

According to the above-mentioned embodiments of the present invention, the OFDM symbols used for sending the P-SCH signals and the S-SCH signals are separated from the OFDM symbol used for sending the PHICH signals in the DwPTS, besides, in order to reduce the time delay for sending the PHICH signals as much as possible, the PHICH signals are sent in the first OFDM symbol or the first several OFDM symbols included in the DwPTS. As long as the OFDM symbols used for sending the P-SCH signals and the S-SCH signals differ from the OFDM symbol used for sending the PHICH signals, the scope of the present invention is intended to encompass such a case.

The above-mentioned description is merely the embodiments of the present invention, and is not used to limit the present invention. Those skilled in the art may devise various modifications and variations from the present invention. All modification, equivalent substitution or improvement etc, made within the principle of the present invention, shall be included in the appended claims of the present invention.

What is claimed is:

1. A method for sending Physical Hybrid ARQ (Automatic Repeat reQuest) Indicator Channel (PHICH) signals in a Downlink Pilot Time Slot (DwPTS), comprising:
   sending, by a base station, the PHICH signals in one or more symbols included in the DwPTS, wherein the one or more symbols for transmitting the PHICH signals are different from symbols for sending Primary-Synchronization Channel (P-SCH) signals or Secondary-Synchronization Channel (S-SCH) signals;
   wherein the P-SCH signals are sent in a third symbol included in the DwPTS;
   if there is 1 symbol used for transmitting the PHICH signals, the PHICH signals are sent in a first symbol included in the DwPTS; and
   if there are 2 symbols used for transmitting the PHICH signals, the PHICH signals are sent in the first symbol and a second symbol included in the DwPTS.

2. The method according to claim 1, wherein the method is applied to a long term evolution system which is in time division duplex mode.

3. The method according to claim 2, wherein the symbol included in the time slot is an orthogonal frequency division multiplexing symbol.

4. A method for sending Physical Hybrid ARQ (Automatic Repeat reQuest) Indicator Channel (PHICH) signals in a Downlink Pilot Time Slot (DwPTS), comprising:
   sending, by a base station, the PHICH signals in one or more symbols included in the DwPTS, wherein the one or more symbols for transmitting the PHICH signals are different from symbols for sending Primary-Synchronization Channel (P-SCH) signals or Secondary-Synchronization Channel (S-SCH) signals;

wherein the P-SCH signals are sent in last symbols included in a time slot 1 and a time slot 11, and the S-SCH signals are sent in penultimate symbols included in the time slot 1 and the time slot 11;

if there is 1 symbol used for transmitting the PHICH signals in the DwPTS, the PHICH signals are sent in a first symbol included in the DwPTS; and if there are 2 symbols used for transmitting the PHICH signals, the PHICH signals are sent in the first symbol and a second symbol included in the DwPTS.

5. The method according to claim 4, wherein the method is applied to a long term evolution system which is in time division duplex mode.

6. The method according to claim 5, wherein the symbol included in a time slot is an orthogonal frequency division multiplexing symbol.

7. A method for sending Physical Hybrid ARQ (Automatic Repeat reQuest) Indicator Channel (PHICH) signals in a Downlink Pilot Time Slot (DwPTS), comprising:

sending, by a base station, the PHICH signals in one or more symbols included in the DwPTS, wherein the one or more symbols for transmitting the PHICH signals are different from symbols for sending Primary-Synchronization Channel (P-SCH) signals or Secondary-Synchronization Channel (S-SCH) signals;

wherein the P-SCH signals are sent in last symbols included in a time slot 1 and a time slot 11, and the S-SCH signals are sent in penultimate symbols included in the time slot 1 and the time slot 11;

if there is 1 symbol used for transmitting the PHICH signals in the DwPTS, the PHICH signals are sent in a first symbol included in the DwPTS; and if there are 3 symbols used for transmitting the PHICH signals, the PHICH signals are sent in the first symbol, a second symbol and a third symbol included in the DwPTS.

8. The method according to claim 7, wherein the method is applied to a long term evolution system which is in time division duplex mode.

9. The method according to claim 8, wherein the symbol included in a time slot is an orthogonal frequency division multiplexing symbol.

* * * * *